United States Patent
Nies et al.

(10) Patent No.: US 11,988,826 B2
(45) Date of Patent: May 21, 2024

(54) METHOD FOR CONTROLLING A DRIVE APPARATUS OF A MICRO-OSCILLATION MIRROR, CONTROL DEVICE AND DEFLECTOR MIRROR APPARATUS

(71) Applicant: Valeo Schalter und Sensoren GmbH, Bietigheim-Bissingen (DE)

(72) Inventors: Jürgen Nies, Bietigheim-Bissingen (DE); Jochen Schenk, Bietigheim-Bissingen (DE); Michael Kleiser, Bietigheim-Bissingen (DE)

(73) Assignee: VALEO SCHALTER UND SENSOREN GMBH, Bietigheim-Bissingen (DE)

( * ) Notice: Subject to any disclaimer, the term of this patent is extended or adjusted under 35 U.S.C. 154(b) by 740 days.

(21) Appl. No.: 16/973,199

(22) PCT Filed: Jun. 4, 2019

(86) PCT No.: PCT/EP2019/064435
§ 371 (c)(1),
(2) Date: Dec. 8, 2020

(87) PCT Pub. No.: WO2019/238467
PCT Pub. Date: Dec. 19, 2019

(65) Prior Publication Data
US 2021/0255454 A1    Aug. 19, 2021

(30) Foreign Application Priority Data

Jun. 15, 2018 (DE) ..................... 10 2018 114 388.5

(51) Int. Cl.
G02B 26/08         (2006.01)
G01S 7/481         (2006.01)
(Continued)

(52) U.S. Cl.
CPC ........ *G02B 26/0841* (2013.01); *G01S 7/4817* (2013.01); *G02B 26/105* (2013.01); *G01S 17/931* (2020.01)

(58) Field of Classification Search
CPC . G02B 26/0841; G02B 26/105; G01S 7/4817; G01S 17/931
(Continued)

(56) References Cited

U.S. PATENT DOCUMENTS

2003/0174382 A1    9/2003   Massieu
2005/0099153 A1    5/2005   Komatsu et al.
(Continued)

FOREIGN PATENT DOCUMENTS

CN    105487224       *  4/2016   ......... G02B 26/0841
DE    102014220115 A1    4/2016
(Continued)

OTHER PUBLICATIONS

First Office Action in corresponding Chinese Application No. 201980040268.9, dated Jun. 27, 2023 (30 pages).
(Continued)

*Primary Examiner* — William Choi
(74) *Attorney, Agent, or Firm* — Osha Bergman Watanabe & Burton LLP

(57) ABSTRACT

A method for controlling a drive apparatus (18) of a micro-oscillation mirror (16), a control device (28) and a deflector mirror apparatus (14) are described. In the method, at least one actuation signal (20) is generated, and the drive apparatus (18) is actuated therewith in such a way that it drives the micro-oscillation mirror (16) in an oscillating fashion, At least one position signal (26) which characterizes the deflection (22) of the micro-oscillation mirror (16) is sensed. The at least one actuation signal (20) is closed-loop controlled on the basis of the at least one position signal (26) in such a way
(Continued)

that the micro-oscillation mirror (16) is driven at its resonant frequency, The amplitude of the at least one position signal (26) is continuously compared with at least one threshold value (38*a*, 38*b*, 38*c*). At least one time interval (42*a*, 42*b*, 42*c*) between at least two passes of the at least one position signal (26) through at least one threshold value (38*a*, 38*b*, 38*c*) is determined. The at least one actuation signal (20) is closed-loop controlled on the basis of the at least one time interval (42*a*, 42*b*, 42*c*).

14 Claims, 3 Drawing Sheets

(51) Int. Cl.
*G02B 26/10* (2006.01)
*G01S 17/931* (2020.01)
(58) Field of Classification Search
USPC ......... 359/198.1, 199.1, 199.2, 199.3, 213.1, 359/214.1, 223.1, 224.1, 224.2, 225.1, 359/290, 298
See application file for complete search history.

(56) References Cited

U.S. PATENT DOCUMENTS

| | | |
|---|---|---|
| 2011/0109951 A1 | 5/2011 | Goren et al. |
| 2011/0320046 A1 | 12/2011 | Drouin et al. |
| 2012/0307211 A1 | 12/2012 | Hofmann et al. |
| 2016/0100139 A1 | 4/2016 | Hofmann et al. |
| 2016/0259058 A1 | 9/2016 | Verheggen et al. |

FOREIGN PATENT DOCUMENTS

| | | |
|---|---|---|
| DE | 102017117697 A1 | 2/2019 |
| EP | 2514211 B1 | 3/2014 |
| GB | 2528847 A | 2/2016 |

OTHER PUBLICATIONS

International Search Report and Written Opinion in corresponding International Application No. PCT/EP2019/064435, dated Sep. 10, 2019 (12 pages).
German Search Report in corresponding German Application No. 10 2018 114 388.5, dated Feb. 27, 2019 (8 pages).

\* cited by examiner

METHOD FOR CONTROLLING A DRIVE APPARATUS OF A MICRO-OSCILLATION MIRROR, CONTROL DEVICE AND DEFLECTOR MIRROR APPARATUS

TECHNICAL FIELD

The invention relates to a method for controlling a drive apparatus of a micro-oscillation mirror, in which
at least one actuation signal is generated, and the drive apparatus is actuated therewith in such a way that it drives the micro-oscillation mirror in an oscillating fashion,
at least one position signal which characterizes the deflection of the micro-oscillation mirror is sensed,
the at least one actuation signal is closed-loop controlled on the basis of the at least one position signal in such a way that the micro-oscillation mirror is driven at its resonant frequency, In addition, the invention relates to a control device for controlling at least one drive apparatus of a micro-oscillation mirror,
having at least one signal generating apparatus for generating at least one actuation signal, with which the at least one drive apparatus can be actuated,
having at least one position sensing apparatus with which at least one position signal which characterizes a deflection of the micro-oscillation mirror can be sensed,
and having at least one apparatus which is connected in a closed-loop controllable fashion to the at least one signal generating apparatus in such a way that the micro-oscillation mirror can be driven at its resonant frequency.

Furthermore, the invention relates to a deflector mirror apparatus of an optical detection device, having
at least one micro-oscillation mirror,
at least one drive apparatus for the at least one micro-oscillation mirror and
a control device for controlling the at least one drive apparatus,
wherein the control device has
at least one signal generating apparatus for generating at least one actuation signal, with which the at least one drive apparatus can be actuated,
at least one position sensing apparatus with which at least one position signal which characterizes a deflection of the micro-oscillation mirror can be sensed,
and at least one apparatus which is connected in a closed-loop controllable fashion to the at least one signal generating apparatus in such a way that the micro-oscillation mirror can be driven at its resonant frequency,

PRIOR ART

EP 2 514 211 B1 discloses a deflection unit which comprises a two-layer, cardanically suspended micro-mirror as a deflection element. The deflection unit or the micromirror is driven by an actuation signal, supplied by an actuation device, for each axle with frequencies f1 and f2 as actuation frequencies. These actuation frequencies f1 and f2 are intended to correspond to resonant frequencies of the mirror. So that the mirror can also be made to track changes in its resonant frequency when they occur, the actuation device has a phase-locked loop which adjusts the phase and therefore the actuation frequency of the actuation signals in such a way that the mirror operates essentially at resonance. In order to sense the phase angle, a measuring device is provided which measures the sinusoidal deflection of the micro-mirror.

The invention is based on the object of configuring a method, a control device and a deflector mirror device of the type mentioned at the beginning in which closed-loop control of the drive apparatus of the micro-oscillation mirror can be simplified, in particular with simpler technical means.

DISCLOSURE OF THE INVENTION

This object is achieved in the method according to the invention in that the amplitude of the at least one position signal is continuously compared with at least one threshold value, and at least one time interval between at least two passes of the at least one position signal through at least one threshold value is determined, and the at least one actuation signal is closed-loop controlled on the basis of the at least one time interval.

According to the invention, the deflection of the micro-oscillation mirror is characterized by at least one position signal. The at least one position signal is continuously sensed, so that a time progression of the amplitude of the at least one position signal characterizes the time progression of the mirror deflection of the micro-oscillation mirror. The amplitude of the at least one position signal is continuously compared with at least one threshold value At least one time interval between at least two passes of the at least one position signal through the at least one threshold value is determined. An oscillation frequency and/or an amplitude of the deflection of the oscillating micro-oscillation mirror can be determined on the basis of the at least one time interval. The at least one actuation signal is closed-loop controlled on the basis of the at least one time interval in such a way that the micro-oscillation mirror is driven at its resonant frequency with the drive apparatus.

At the resonant frequency, the micro-oscillation mirror can be driven efficiently.

The amplitude of the at least one position signal can advantageously be compared with at least two threshold values. In this way, the accuracy of the closed-loop control of the drive apparatus can be improved.

At least one time interval between at least two passes of the at least one position signal through different threshold values can advantageously be determined In this way, positive gradients of the amplitude progression of the at least one position signal can be determined.

The driven micro-oscillation mirror can advantageously carry out a sinusoidal oscillation. In this context, the micro-oscillation mirror can be driven actively in at least one oscillation direction by means of the drive apparatus. Active deflection of the micro-oscillation mirror can be caused by the at least one actuation signal by means of the drive apparatus. In this context, a rising edge of the oscillation of the micro-oscillation mirror occurs. After the pulse of the actuation signal has been removed, the micro-oscillation mirror is deflected owing to its inertia until a maximum deflection is reached. During the active deflection of the micro-oscillation mirror, an elastic resetting apparatus, in particular in the form of at least one resetting spring, can be prestressed. The resetting apparatus can be part of the drive apparatus. After the maximum deflection has been reached, the micro-oscillation mirror can be pivoted back by means of the resetting device. In this context, a falling edge of the oscillation of the micro-oscillation mirror occurs.

At the rising edge of the oscillation of the micro-oscillation mirror it is possible to sense a rising pulse of the at least one position signal. At the falling edge, a falling pulse of the at least one position signal can be sensed. Owing to the active deflection of the micro-oscillation mirror with the drive apparatus, the maximum value of the rising pulse, which can also be referred to as the maximum rise, can be larger there than the maximum value of the falling pulse, which can also be referred to as the maximum fall and which is ultimately caused by the resetting apparatus.

The maximum values of the amplitudes of the at least one position signal according to the invention relate to the same side of the zero crossing of the at least one position signal In particular, the maximum values can relate to the positive side of the at least one position signal. Alternatively, all the threshold values and the maximum values can be located on the negative side with respect to the zero crossing of the at least one position signal.

The micro-oscillation mirror can be part of an optical detection device for sensing objects.

The optical detection device can advantageously be a scanning system, in particular a laser scanner. In this context, a monitored area can be sensed, that is to say scanned, with transmission signals. For this purpose, the corresponding transmission signals, in particular transmission beams, can, as it were, be pivoted with respect to their propagation direction over the monitored area. In this context, at least one deflector mirror apparatus can be used, which can contain at least one micro-oscillation mirror with a corresponding control device and a corresponding drive apparatus.

The invention can be used in a vehicle, in particular a motor vehicle. The invention can advantageously be used in a land-based vehicle, in particular a passenger vehicle, a lorry, a bus, a motorcycle or the like, an aircraft and/or a watercraft. The invention can also be used in autonomous, or at least partially autonomous, vehicles.

The detection device can advantageously be connected to at least one electronic control device of a vehicle, in particular a driver assistance system and/or a chassis control system and/or a driver information apparatus and/or a parking assistance system or the like or can be part of such a device, system or apparatus.

In such an advantageous refinement of the method, at least one threshold value can be predefined to a constant value and/or at least one threshold value can be set in a variable fashion.

Constant threshold values can be easily stored.

Variable threshold values have the advantage that they can be adapted to an operating situation of the drive apparatus. This permits an overall improvement in the closed-loop control. The at least one threshold value can also be adapted while the micro-oscillation mirror is operating. In this way, in particular component-related and/or assembly-related tolerances of the drive apparatus and/or of the micro-oscillation mirror can be compensated. In particular, when the micro-oscillation mirror is started, tolerances can be better compensated by means of variable threshold values.

In a further advantageous configuration of the method, a zero crossing of the least one position signal can be predefined as a threshold value.

and/or at least one threshold value can be predefined between maximum values of the amplitude of the at least one position signal, and/or the amplitude of at least one threshold value can be predefined below the maximum values of the amplitudes of different pulses of the at least one position signal, wherein the maximum values of the amplitude of the pulses of the at least one position signal occur with the same sign during a period of the at least one position signal.

The zero crossing of the at least one position signal can be easily determined, so that the corresponding threshold value can be easily implemented.

A threshold value whose amplitude is predefined between two maximum values of the amplitude of different pulses of the at least one position signal can be used to sense a period of the oscillation of the micro-oscillation mirror. In this context, the maximum values of the different pulses are of different sizes.

One of the maximum values can advantageously correspond to the amplitude of two different pulses of the at least one position signal, in particular the larger of the maximum values can correspond to a rising edge of the oscillation of the micro-oscillation mirror. The other of the maximum values, particularly the smaller maximum value, can correspond to a falling edge of the oscillation of the micro-oscillation mirror. In this way, a time interval between the active deflection of the micro-oscillation mirror can be sensed by means of a pulse of the at least one actuation signal and the swinging back of the micro-oscillation mirror after the pulse has been switched off.

The entire oscillation period or just a partial oscillation period of the micro-oscillation mirror can be sensed with a threshold value whose amplitude is predefined below the maximum values of the amplitudes of the pulses of the at least one position signal. The at least one threshold value can be predefined below the smallest of the maximum values of the amplitudes of the pulses of the at least one position signal.

In a further advantageous configuration of the method, a time interval between a pass of the at least one position signal through a threshold value and a pass of the at least one position signal through the same threshold value in the next period of the at least one position signal can be determined, and a period duration of the oscillation of the micro-oscillation mirror can be determined therefrom. In this way, the period duration of the oscillation of the micro-oscillation mirror can be determined with just one threshold value.

The time interval between the pass of the at least one position signal through the threshold value and the pass through the same threshold value in the next period at the same edge, in particular the falling edge or the rising edge, of the least one position signal, can advantageously be determined. In this way, the time interval corresponds precisely to the period of the least one position signal.

In a further advantageous refinement of the method, a time interval between a pass of the at least one position signal through a first threshold value and the next pass through a second threshold value can be determined and a deflection of the micro-oscillation mirror can be determined therefrom. In this way, the deflection of the micro-oscillation mirror can be determined using two threshold values during a pulse of the at least one position signal. The passes can therefore be sensed at the same edge, in particular at the rising edge or the falling edge, of the oscillation of the micro-oscillation mirror.

The amplitude of the first threshold value can be predefined here between maximum values of the amplitudes of two different pulses of the at least one position signal, The amplitude of the second threshold value can be predefined below the smallest of the maximum values of the amplitudes of the pulses of the at least one position signal.

The passes can therefore be advantageously sensed at the same edge, in particular at the falling edge or the rising edge, of the at least one position signal. In this way, a positive gradient of the progression of at least one position signal can be determined.

In a further advantageous configuration of the method, a time interval between a pass of the at least one position signal at a falling pulse of the at least one position signal through a threshold value and a pass of the at least one position signal through the same threshold value at the next rising pulse of the at least one position signal can be determined, and/or a time interval between a pass of the at least one position signal at a rising pulse of the at least one position signal through a threshold value and a pass of the at least one position signal through the same threshold value at the next falling pulse of the at least one position signal can be determined, and a phase relationship between the at least one actuation signal and the at least one position signal can be determined from the at least one time interval.

In this way, in particular a pulse duty factor of the actuation signal can be adapted from the phase relationship in such a way that the micro-oscillation mirror can be operated at its resonant frequency.

At least one time interval between the passes through a threshold value defined by the zero line of the least wrong position signal can be advantageously determined.

In a further advantageous configuration of the method,
at least one pass of the at least one position signal through the at least one threshold value can be sensed in at least one falling edge of the at least one position signal, and/or at least one pass of the at least one position signal through the at least one threshold value can be sensed in at least one rising edge of the at least one position signal, In this way, the reproducibility of the measurements can be improved.

In a further advantageous configuration of the method, at least one threshold value can be generated with at least one digital/analogue converter, and/or at least one threshold value can be generated with at least one voltage divider. Digital/analogue converters and voltage dividers can be implemented easily and cost-effectively.

In a further advantageous configuration of the method, at least one position signal can be compared with at least one threshold value by means of at least one comparison apparatus. In addition, the corresponding time intervals can be sensed with the at least one comparison apparatus. The at least one comparison apparatus can be what is referred to as a comparator.

What is referred to as a multi-comparator can advantageously be used as a comparison apparatus. With a multi-comparator, the at least one position signal can, in particular, be compared simultaneously with a plurality of threshold values.

A rapid 1-bit analogue/digital conversion can advantageously be used for the comparison of the at least one position signal with at least one threshold value In this way, a high temporal resolution can be achieved.

In a further advantageous configuration of the method, the at least one actuation signal can be implemented on the basis of at least one pulse-width-modulated signal. In this way, the pulse duty factor of the pulse-width-modulated signal can be adapted to a required angular resolution of the micro-oscillation mirror. Therefore, a resolution of an amplitude of an analogue actuation voltage can be appropriately set for the drive apparatus of the micro-oscillation mirror.

A number of pulse-width-modulated pulses for the at least one actuation signal can be derived from the resonant frequency of the micro-oscillation mirror in an oscillation period of the micro-oscillation mirror. A deflection angle of the micro-oscillation mirror can therefore be set and closed-loop controlled by the pulse duty factor of the pulse-width-modulated actuation signal. A frequency of the oscillation of the micro-oscillation mirror can be set and closed-loop controlled by a total number of pulse-width-modulated pulses of the at least one actuation signal in one period. An amplitude of a driver voltage for actuating the drive apparatus is obtained from the pulse duty factor of the pulse-width-modulated actuation signal. A frequency of the driver voltage is obtained from the number of pulsewidth-modulated pulses of the actuation signal.

In a further advantageous configuration of the method, at least one position signal can be implemented on the basis of a comb capacitance, dependent on the deflection of the micro-oscillation mirror, of the drive apparatus. In this way, an electrical variable can easily be determined as a basis for at least one position signal. This movement of the micro-oscillation mirror causes the electrical capacitance of a comb structure of the drive apparatus to change. The change in the comb capacitance or the change therein can be correspondingly sensed and characterizes the time progression of the mirror deflection of the micro-oscillation mirror.

The movement of the micro-oscillation mirror can be output in the form of a charging and discharging current as a result of the changing comb capacitance as position information about the mirror deflection of the micro-oscillation mirror. The change in the comb capacitance can be converted into a proportional electrical voltage. In this context, the frequency of the voltage can correspond to the oscillation frequency of the micro-oscillation mirror. The change in amplitude can be a measure of the deflection of the micro-oscillation mirror.

The drive apparatus can advantageously have at least one so-called comb drive. In this way, the comb capacitance of the comb drive can contribute to implementing at least one position signal.

The comb drive of the drive apparatus can advantageously additionally serve as a measuring apparatus for sensing the at least one position signal. In this way, it is possible to dispense with an additional apparatus for sensing positions.

Additionally or alternatively, at least one position signal can be determined from a measurement variable which is different from the comb capacitance, which characterizes the deflection of the micro-oscillation mirror.

The object is also achieved according to the invention in the control device by virtue of the fact that the control device has at least one comparison apparatus with which the at least one position signal can be continuously compared with at least one threshold value, at least one time interval between at least two passes of the at least one position signal through at least one threshold value can be determined with the control device, and the at least one actuation signal can be closed-loop controlled on the basis of the at least one time interval.

According to the invention, it is therefore possible to dispense with complex and expensive electronic components, such as, in particular, high speed analogue/digital converters.

In one advantageous embodiment, the control device can have at least one digital/analogue converter and/or at least one voltage divider for generating at least one threshold value. Digital/analogue converters and voltage dividers can be implemented easily and cost-effectively.

In a further advantageous embodiment, at least one position sensing apparatus and/or at least one drive apparatus can be implemented with at least one comb structure. With a comb structure, a comb drive can easily be formed for the drive apparatus. In addition, a comb structure of the position sensing apparatus can have an electrical capacitance, what is referred to as comb capacitance, which can be sensed as a measure of the deflection of the micro-oscillation mirror.

At least one position sensing apparatus and at least one drive apparatus can advantageously be implemented with the same at least one comb structure. In this way, technical expenditure can be reduced further.

At least one signal-generating apparatus may be advantageously suitable for generating at least one pulse-width-modulated actuation signal. With a pulse-width-modulated control signal it is possible to drive the drive apparatus in such a way that the micro-oscillation mirror can be pivoted to an fro between two maximum deflections.

The control device can advantageously be implemented with what is referred to as a field programmable gate array (FPGA) module. In this way, the control apparatus can be easily adapted in situ.

At least one comparison apparatus can be advantageously implemented as part of an FPGA module. In this way, technical expenditure, in particular expenditure on components, can be reduced further.

At least one comparison apparatus can advantageously be implemented as a comparator in the FPGA module. In this way, the at least one comparison apparatus can also be adapted in situ.

The object is also achieved according to the invention in the deflector mirror apparatus by virtue of the fact that the control device has at least one comparison apparatus with which the at least one position signal can be continuously compared with at least one threshold value, at least one time interval between at least two passes of the at least one position signal through at least one threshold value can be determined with the control device, and the at least one actuation signal can be closed-loop controlled on the basis of the at least one time interval. According to the invention, the deflector mirror apparatus is implemented with simple, in particular cost-effective, technical means.

Moreover, the features and advantages indicated in connection with the method according to the invention, the control device according to the invention and the deflector mirror apparatus according to the invention and the respective advantageous configurations thereof apply here in a mutually corresponding manner and vice versa. The individual features and advantages can of course be combined with one another, wherein further advantageous effects can occur that go beyond the sum of the individual effects.

BRIEF DESCRIPTION OF THE DRAWINGS

Further advantages, features and details of the invention are apparent from the following description, in which an exemplary embodiment of the invention will be explained in more detail with reference to the drawing. A person skilled in the art will also expediently consider individually the features which have been disclosed in the drawing, the description and the claims in combination and combine them to form further meaningful combinations. In the drawing:

In the figures, identical structural elements are provided with the same reference numerals.

EMBODIMENT(S) OF THE INVENTION

Figure 1:
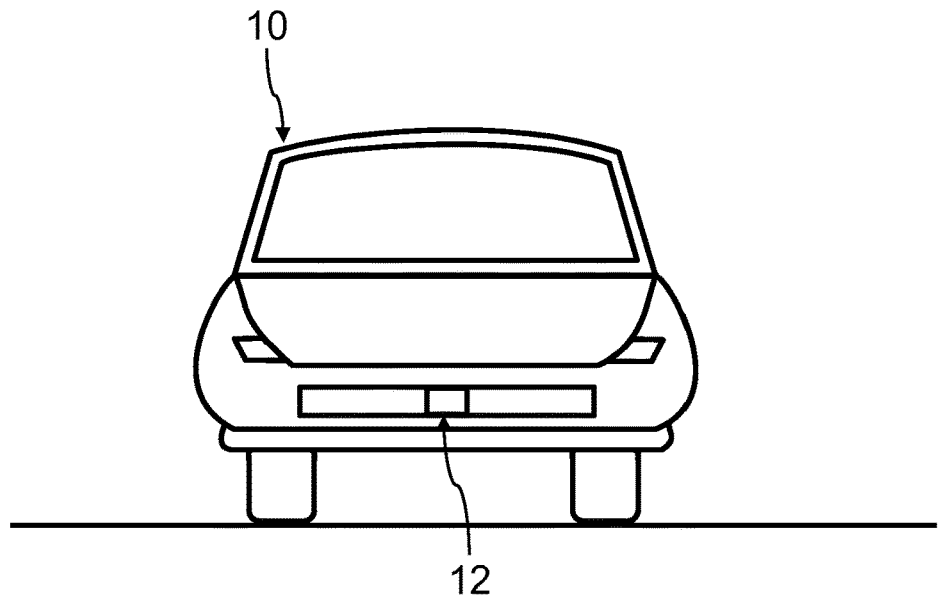
FIG. 1 shows a front view of a vehicle with a laser scanner for monitoring a monitoring region ahead of the vehicle in the direction of travel.

FIG. 1 illustrates a vehicle by way of example in the form of a passenger vehicle in a front view. The vehicle 10 comprises a scanning optical detection device by way of example in the form of a laser scanner 12. The laser scanner 12 is arranged by way of example in the front bumper of the vehicle 10.

The laser scanner 12 can be used to monitor a monitoring region in the driving direction of the vehicle 10 in front of the vehicle 10 for objects. For this purpose, the monitoring region can be scanned with corresponding transmission signals using the laser scanner 12. When an object is present, the transmission signals are reflected and sent back to the laser scanner 12. The reflected signals are received with a corresponding receiver of the laser scanner 12.

The laser scanner 12 operates according to what is referred to as a propagation time method in which a propagation time between the emission of a transmission signal and the reception of a reflected transmission signal can be sensed, and a distance, speed and/or a direction of the object relative to the vehicle 10 can be determined therefrom.

The laser scanner 12 has a transmitter for emitting transmission signals, a receiver for receiving the reflected transmission signals, a deflector mirror apparatus 14 for deflecting the transmission signals and a control and evaluation apparatus for controlling the transmitter, the receiver and the deflector mirror apparatus 14 and for evaluating received signals. The beam directions of the transmission signals in the monitoring region are pivoted with the deflector mirror apparatus 14 so that the latter can be scanned with the transmission signals.

Figure 2:
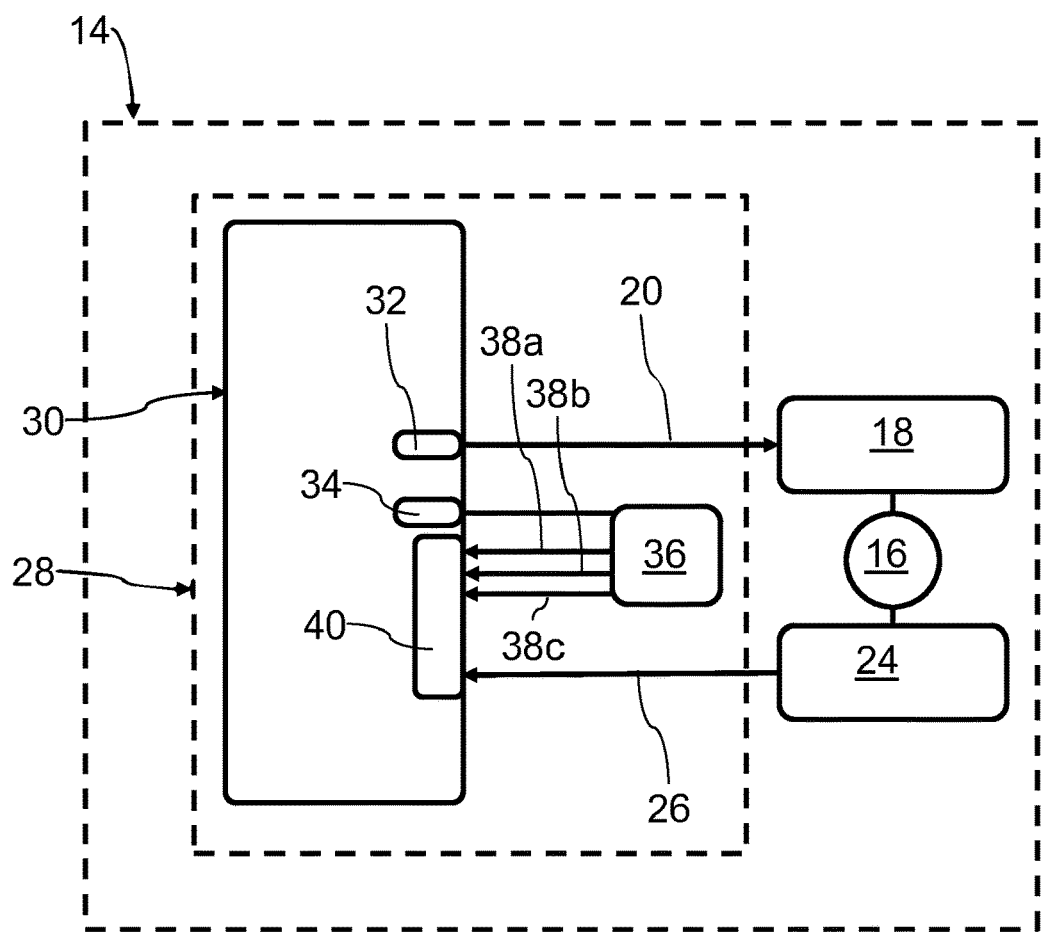
FIG. 2 shows a circuit design of a deflector mirror apparatus of the laser scanner from FIG. 1 with a micro-oscillation mirror and a control device for a drive apparatus of the micro-oscillation mirror.

FIG. 2 shows an exemplary circuit design of the deflector mirror apparatus 14. The deflector mirror apparatus 14 comprises a micro-oscillation mirror 16. The micro-oscillation mirror 16 is configured as what is referred to as a micro-system component which is referred to as a micro-electromechanical system (MEMS). The micro-oscillation mirror 16 is mounted about a pivoting axis in such a way that it can be pivoted to and fro between two maximum deflections.

The micro-oscillation mirror 16 is connected in a driveable fashion to a drive apparatus 18. The drive apparatus 18 has what is referred to as a comb drive, with which the micro-oscillation mirror 16 can be driven in a drive oscillation direction. In addition, the drive apparatus 18 has a resetting apparatus, for example in the form of a torsion spring, with which the micro-oscillation mirror 16 can be moved back counter to the drive oscillation direction.

The comb drive of the drive apparatus 18 is operated with high voltage. The comb drive is equipped, by way of example, with interacting comb structures and can be actuated by applying an actuation signal 20, shown in FIG. 3.

Figure 4:
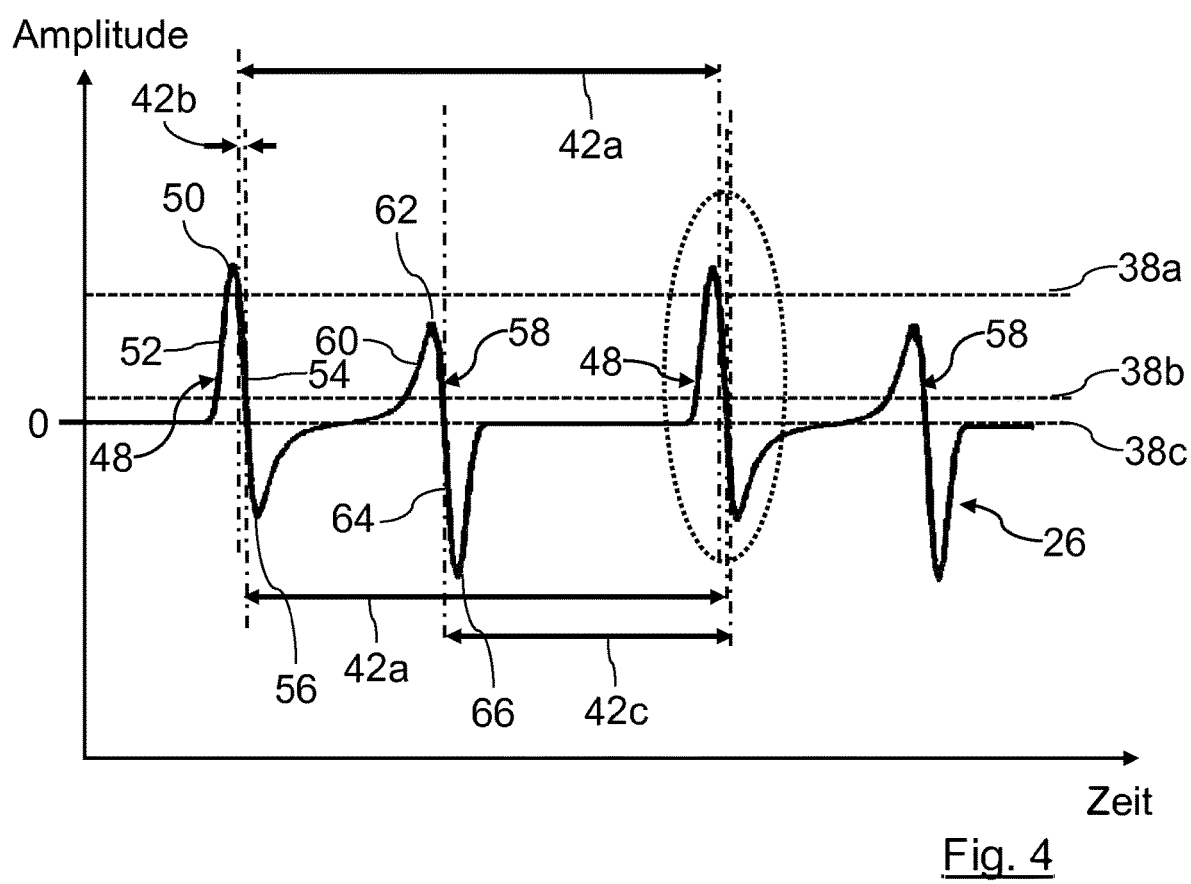
FIG. 4 shows the amplitude/time diagram of the position signal corresponding to FIG. 3 and three threshold values with which the position signal is compared.
Figure 5:
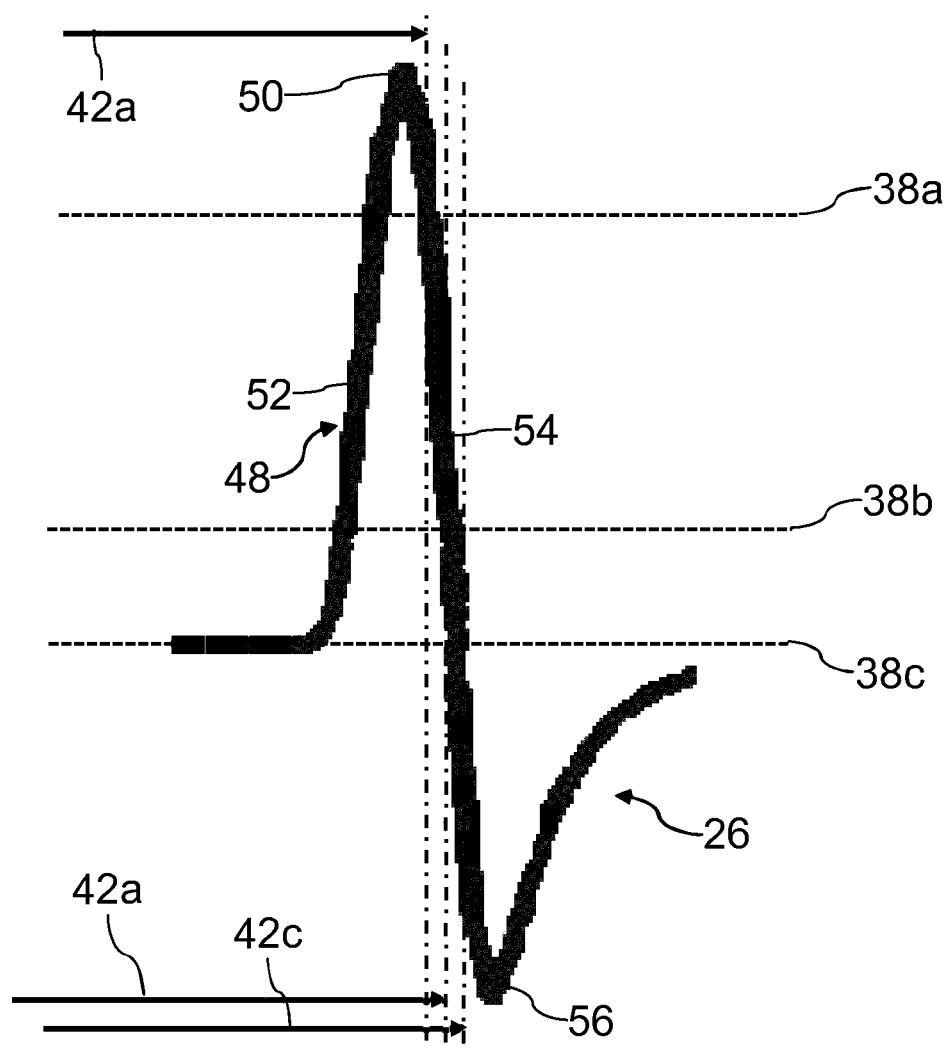
FIG. 5 shows a detail of the amplitude/time diagram from FIG. 4 in the region of a pulse of the position signal.

In addition, the deflector mirror apparatus 14 has a position sensing apparatus 24 with which the mirror deflection 22 can be sensed in respect of its time progression. The position sensing apparatus 24 uses the comb structure of the comb drive of the drive apparatus 18 for this. In this context, a charging and discharging current is sensed in a changing comb capacitance of the comb drive owing to the oscillation of the micro-oscillation mirror 16. The change in capacitance is converted into a proportional voltage, wherein the frequency of the voltage of the mirror-oscillation frequency and the change in amplitude are a measure of the deflection of the micro-oscillation mirror 16. The comb capacitance which is converted into a change in amplitude is output as a position signal 26 which characterizes the mirror deflection 22 of the micro-oscillation mirror 16 in the time progression. The position signal 26 is shown by way of example in FIGS. 3 to 5.

In order to actuate the drive apparatus 18, a control device 28 is provided. The actuation signal 20 and therefore the drive apparatus 18 are closed-loop controlled using the position signal 26.

The control device 28 is configured by way of example as what is referred to as an FPGA module 30. The control device 28 comprises a signal generating apparatus 32. The actuation signal 20 can be generated with the signal generating apparatus 32. The signal generating apparatus 32 has a signal-transmitting connection to the drive apparatus 18.

In addition, the FPGA module 30 comprises a serial peripheral interface 34 (SPI) which is connected to a digital/analogue converter (D/A converter 36) which is implemented outside the FPGA module 30. Three threshold values 38a, 38b and 38c which are in the order of magnitude of the position signal 26 in terms of amplitude can be generated with the D/A converter 36, by way of example. The threshold values 38a, 38b and 38c can be predefined here in a variably adjustable or permanently predefined fashion. More than three threshold values 38a, 38b and 38c can also be output with the D/A converter 36.

The FPGA module 30 also has a comparison apparatus 40, by way of example in the form of a multi-comparator whose inputs are connected to the outputs of the D/A converter 36. The threshold values 38a, 38b and 38c can be fed to the comparison apparatus 40 by the D/A converter 36.

A comparison input of the comparison apparatus 40 is connected to the output of the position sensing apparatus 24. The position signal 26 can be applied there.

The amplitude of the position signal 26 can be continuously compared with the threshold values 38a, 38b and 38c using the comparison apparatus 40.

Time intervals 42a, 42b, 42c and 42d between corresponding passes of the position signal 26 through the corresponding threshold values 38a, 38b or 38c can be determined using the comparison apparatus 40. The actuation signal 20 can be closed-loop controlled with the FPGA module 30 on the basis of the time intervals 42a, 42b, 42c and 42d.

Figure 3:
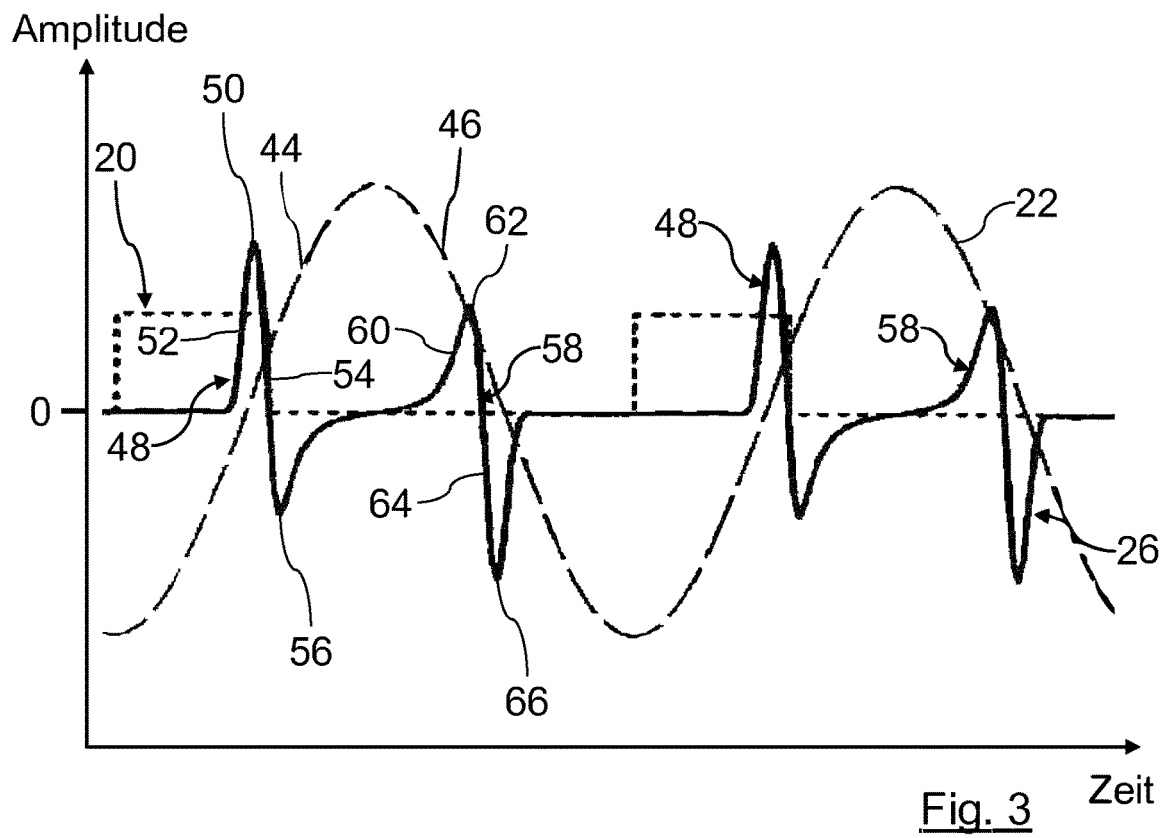
FIG. 3 shows an amplitude/time diagram with the time progressions of an actuation signal for actuating the drive apparatus, a mirror deflection of the micro-oscillation mirror and a position signal which characterizes the time progression of the mirror deflection of the mirror-oscillation mirror.

FIG. 3 shows the time progressions of the actuation signal 20, of the mirror deflection 22 and of the position signal 26. In this context, their respective amplitude zero lines are positioned one on top of the other for the sake of better clarity. The amplitudes of the actuation signal 20, of the mirror deflection 22 and of the position signal 26 in FIG. 3 do not correspond in terms of the mass unit and order of magnitude. FIG. 3 serves merely for the comparison of the respective time progressions.

The actuation signal 20 is, by way of example, a pulse-width-modulated signal. In this context, unipolar square-wave pulses are generated at periodic intervals. The duration of the pulses is less than the duration of the pause between the pulses. The ratio of the pulse duration to the period duration is referred to as the pulse duty factor. The pulse duty factor of the actuation signal 20 can be changed in the signal generating apparatus 32.

The comb drive of the drive apparatus 18 is actuated by the pulses of the actuation signal 20, so that the micro-oscillation mirror 16 is excited to oscillate. The mirror deflection 22 is here a sinusoidal oscillation pulse in the time progression. In this context, a pulse of the actuation signal 20 brings about a rising edge 44 of the mirror deflection 22 in the drive oscillation direction. After the end of the pulse of the actuation signal 20, the micro-oscillation mirror 16 continues to oscillate in the drive oscillation direction to its positive maximum deflection. After the positive maximum deflection has been reached, the oscillation direction of the micro-oscillation mirror 16 is reversed. At a falling edge 46, the micro-oscillation mirror 16 is moved back with the resetting apparatus counter to the drive oscillation direction. The micro-oscillation mirror 16 oscillates further up to its negative maximum deflection, at the bottom of FIG. 3. After a maximum negative deflection has been reached, the micro-oscillation mirror 16 oscillates again in the drive oscillation direction at a following rising edge 44. In this context, the micro-oscillation mirror 16 is again driven in the drive oscillation direction with the following pulse of the actuation signal 20. The objective of the invention is to actuate the micro-oscillation mirror 16 at its resonant frequency with the actuation signal 20. At the resonant frequency, the micro-oscillation mirror 16 can be efficiently driven with the actuation signal 20.

During the oscillation of the micro-oscillation mirror 16, the position signal 26 is determined from the comb capacitance of the comb drive of the drive apparatus 18. The position signal 26 comprises two bipolar pulses, referred to below as the rising pulse 48 and falling pulse 58, which repeat periodically. The periodicity of the position signal 26 corresponds to the periodicity of the mirror deflection 22. While the mirror deflection 22 passes through a rising edge 44, the rising pulse 48 of the position signal 26 is firstly generated with a rising edge 52. The rising pulse 48 has a maximum rise 50 on the positive side, at the top of FIG. 3, at the end of the rising edge 52. The maximum rise 50 corresponds chronologically to the pass of the rising edge 44 of the mirror deflection 22 through the zero crossing of the micro-oscillation mirror 16.

After the maximum rise 50 has been reached, the rising pulse 48 changes into a falling edge 54, passes through the zero line and reaches a minimum rise 56 below the zero line of the position signal 26. The maximum rise 50, the rising edge 52, the falling edge 54 and the minimum rise 56 are located chronologically in the region of the rising edge 44 of the mirror deflection 22.

While the mirror deflection 52 runs to its positive maximum deflection, the position signal 26 rises in the direction of its zero line. In the region of the zero line, the position signal 26 has an inflexion point which corresponds chronologically to the positive maximum deflection of the micro-oscillation mirror 15.

The swinging back of the micro-oscillation mirror 16 at the falling edge 46 of the mirror deflection 22 gives rise to a falling pulse 58 of the position signal 26. The falling pulse 58 of the position signal 26 initially has a rising edge 60 which rises up to a maximum fall 62. Subsequent to the maximum fall 62, the position signal 26 changes into a falling edge 64 of the falling pulse 58. The falling edge 64 passes through the zero line of the position signal 26 and ends at a minimum fall 66. The minimum fall 66 corresponds chronologically to the pass of the falling edge 46 of the mirror deflection 22 through the zero crossing of the micro-oscillation mirror 16.

Subsequent to the minimum fall 66, the amplitude of the position signal 26 rises again to the zero line.

The entire falling pulse 58 with the rising edge 60, the maximum fall 62, the falling edge 64 and the minimum fall 66 are located chronologically within the falling edge 46 of the mirror deflection 22.

The rising pulse 48 and falling pulse 58 repeat with the periodicity of the mirror deflection 22.

In order to adapt the pulse duty factor of the actuation signal 20 to the resonant frequency of the micro-oscillation mirror 16, the position signal 26 is compared with the threshold values 38a, 38b and 38c. Corresponding time intervals 42a, 42b and 42c are determined between specific passes of the position signal 26 through the threshold values 38a, 38b and 38c. The pulse duty factor of the actuation signal 20 is correspondingly adapted on the basis of the time intervals 42a, 42b and 42c.

The amplitude of the first threshold value 38a is predefined in the region between the maximum rise 50 and the maximum fall 62 of the position signal 26. The second threshold value 38b is predefined below the maximum fall 62 of the position signal 26, that is to say between the zero line and the maximum fall 62. The third threshold value 38c is predefined in accordance with the zero line of the position signal 26.

The time interval 42a is determined between a pass of the position signal 26 through the first threshold value 38a at the falling edge 54 of the rising pulse 48 and a pass of the position signal 26 at the falling edge 54 of the rising pulse 48 through the same threshold value 38a in the next period of the position signal 26. The period duration of the oscillation of the micro-oscillation mirror 16 is determined from the first time interval 42a.

Alternatively or additionally, the first time interval 42a can be determined between a pass of the position signal 26 through the second threshold value 38b at the falling edge 54 of the rising pulse 48 and a pass of the position signal 26 at the falling edge 54 of the rising pulse 48 through the same threshold value 38b in the next period of the position signal 26.

The second time interval 42b is determined between a pass of the position signal 26 through the first threshold value 38a at the falling edge 54 of the rising pulse 48 and the next pass through the second threshold value 38b at the same falling edge 54 of the rising pulse 48. The deflection of the micro-oscillation mirror 16 is determined from the second time interval 42b.

The third time interval 42c is determined between a pass of the position signal 26 through the third threshold value 38c at the falling edge 64 of the falling pulse 58 and a pass of the position signal 26 through the same threshold value 38c at the falling edge 54 of the next rising pulse 48 of the position signal 26. A phase relationship between the actuation signal 20 and the position signal 26 is determined from the third time interval 42c.

The actuation signal 20 is correspondingly closed-loop controlled on the basis of the time intervals 42a, 42b and 42c, i.e. the period duration, the deflection and the phase relationship, so that the micro-oscillation mirror 16 is driven at its resonant frequency.

The threshold values 38a, 38b and 38c can optionally be adapted in a variable fashion. For example, the threshold values 38a, 38b and 38c can be adapted in a starting phase when the deflector mirror apparatus 14 is operating. For example, fabrication tolerances at the micro-oscillation mirror 16 can therefore be better compensated.

The invention claimed is:

1. A method for controlling a drive apparatus of a micro-oscillation mirror, the method comprising:
    generating at least one actuation signal for actuation of the drive apparatus in such a way that the driver apparatus drives the micro-oscillation mirror in an oscillating manner;
    sensing at least one position signal which characterizes the deflection of the micro-oscillation mirror,
    wherein the at least one actuation signal is closed-loop controlled on the basis of the at least one position signal in such a way that the micro-oscillation mirror is driven at its resonant frequency;
    continuously comparing an amplitude of the at least one position signal at least one threshold value; and
    determining at least one time interval between at least two passes of the at least one position signal through at least one threshold value, wherein the at least one actuation signal is closed-loop controlled on the basis of the at least one time interval,
    wherein a time interval between a pass of the at least one position signal through a first threshold value and the next pass through a second threshold value is determined and a deflection of the micro-oscillation mirror is determined therefrom.

2. The method according to claim 1, wherein at least one threshold value is predefined to a constant value and/or at least one threshold value is set in a variable fashion.

3. The method according to claim 1, wherein:
    a zero crossing of the at least one position signal is predefined as a threshold value, or
    at least one threshold value is predefined between maximum values of the amplitude of the at least one position signal, or
    the amplitude of at least one threshold value is predefined below the maximum values of the amplitudes of different pulses of the at least one position signal, and
    the maximum values of the amplitude of the pulses of the at least one position signal occur with the same sign during a period of the at least one position signal.

4. The method according to claim 1, wherein a time interval between a pass of the at least one position signal through a threshold value and a pass of the at least one position signal through the same threshold value in the next period of the at least one position signal is determined, and a period duration of the oscillation of the micro-oscillation mirror is determined therefrom.

5. The method according to claim 1, wherein:
    a time interval between a pass of the at least one position signal at a falling pulse of the at least one position signal through a threshold value and a pass of the at least one position signal through the same threshold value at the next rising pulse of the at least one position signal is determined,
    a time interval between a pass of the at least one position signal at a rising pulse of the at least one position signal through a threshold value and a pass of the at least one position signal through the same threshold value at the next falling pulse of the at least one position signal is determined, and a phase relationship between the at least one actuation signal and the at least one position signal is determined from the at least one time interval.

6. The method according to claim 1, wherein:

at least one pass of the at least one position signal through the at least one threshold value is sensed in at least one falling edge of the at least one position signal, and at least one pass of the at least one position signal through the at least one threshold value is sensed in at least one rising edge of the at least one position signal.

7. The method according to claim 1, wherein at least one threshold value is generated with at least one digital/analogue converter, and/or at least one threshold value is generated with at least one voltage divider.

8. The method according to claim 1, wherein at least one position signal is compared with at least one threshold value by at least one comparison apparatus.

9. The method according to claim 1, wherein the at least one actuation signal is implemented on the basis of at least one pulse-width-modulated signal.

10. The method according to claim 1, wherein at least one position signal is implemented on the basis of a comb capacitance, dependent on the deflection of the micro-oscillation mirror, of the drive apparatus.

11. A control device for controlling at least one drive apparatus of a micro-oscillation mirror, the control device comprising:

at least one signal generating apparatus for generating at least one actuation signal, with which the at least one drive apparatus is actuated;

at least one position sensing apparatus configured to sense at least one position signal characterizing a deflection of the micro-oscillation mirror;

at least one apparatus which is connected in a closed-loop controllable fashion to the at least one signal generating apparatus in such a way that the micro-oscillation mirror is driven at its resonant frequency;

at least one comparison apparatus with which the at least one position signal is continuously compared with at least one threshold value, wherein at least one time interval between at least two passes of the at least one position signal through at least one threshold value is determined with the control device, and the at least one actuation signal is closed-loop controlled on the basis of the at least one time interval, and wherein a time interval between a pass of the at least one position signal through a first threshold value and the next pass through a second threshold value is determined and a deflection of the micro-oscillation mirror is determined therefrom.

12. The control device according to claim 11, further comprising at least one digital/analogue converter or at least one voltage divider for generating at least one threshold value.

13. The control device according to claim 11, wherein the at least one position sensing apparatus and/or the at least one drive apparatus is implemented with at least one comb structure.

14. A deflector mirror apparatus of an optical detection device, comprising:

at least one micro-oscillation mirror;

at least one drive apparatus for the at least one micro-oscillation mirror; and a control device for controlling the at least one drive apparatus, wherein the control device comprises:

at least one signal generating apparatus for generating at least one actuation signal, with which the at least one drive apparatus is actuated, at least one position sensing apparatus configured to sense at least one position signal characterizing a deflection of the micro-oscillation mirror, at least one apparatus which is connected in a closed-loop controllable fashion to the at least one signal generating apparatus in such a way that the micro-oscillation mirror is driven at its resonant frequency, at least one comparison apparatus for continuously comparing the at least one position signal with at least one threshold value, wherein at least one time interval between at least two passes of the at least one position signal through at least one threshold value is determined with the control device, and the at least one actuation signal is closed-loop controlled on the basis of the at least one time interval, wherein a time interval between a pass of the at least one position signal through a first threshold value and the next pass through a second threshold value is determined and a deflection of the micro-oscillation mirror is determined therefrom.

* * * * *